US 6,601,806 B2

(12) United States Patent
Wing et al.

(10) Patent No.: US 6,601,806 B2
(45) Date of Patent: Aug. 5, 2003

(54) SYSTEM AND METHOD FOR LEVELING AN APPLIANCE

(75) Inventors: Forrest F. Wing, Des Moines, IA (US); James M. Grace, Elberon, IA (US); Greg A. Scorpil, Tipton, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/195,684

(22) Filed: Jul. 15, 2002

(65) Prior Publication Data

US 2003/0019982 A1 Jan. 30, 2003

Related U.S. Application Data

(60) Provisional application No. 60/305,791, filed on Jul. 16, 2001.

(51) Int. Cl.$^7$ .............................................. F16M 11/24
(52) U.S. Cl. ........................................ 248/188.2; 16/19
(58) Field of Search ...................... 248/188.2, 188.3, 248/188.4; 16/19, 34

(56) References Cited

U.S. PATENT DOCUMENTS

| 3,040,391 | A | | 6/1962 | Saunders ..................... 49/425 |
|---|---|---|---|---|
| 3,534,430 | A | | 10/1970 | Kesling et al. |
| 3,858,270 | A | * | 1/1975 | Crowe ............................ 16/19 |
| 4,748,715 | A | | 6/1988 | Rice ............................... 16/19 |
| 4,763,868 | A | | 8/1988 | Teich ......................... 248/558 |
| 4,783,879 | A | | 11/1988 | Weaver .......................... 16/34 |
| 4,955,569 | A | * | 9/1990 | Hottmann ................ 248/188.2 |
| 5,749,550 | A | * | 5/1998 | Jackson ................... 248/188.2 |
| 5,971,408 | A | | 10/1999 | Mandel et al. ............. 280/43.2 |

* cited by examiner

Primary Examiner—Ramon O. Ramirez
(74) Attorney, Agent, or Firm—McKee, Voorhees & Sease, P.L.C.

(57) ABSTRACT

A wheeled leveling device is provided that includes a cabinet bracket, a wheel assembly, and an adjustment screw. The cabinet bracket includes a pair of slots that include detent portions. The wheel assembly includes a roller rotatably secured to a wheel assembly bracket. A pair of rockers secured to the wheel assembly bracket slide into and engage with the slots of the cabinet bracket. The rockers pivot about the detent portions of the slots such that the wheel assembly does not disengage. The adjustment screw passes through a hole in the cabinet bracket and a hole in the wheel assembly bracket and engages with a threaded fastener secured to the wheel assembly bracket. Turning the adjustment screw causes the wheel assembly to pivot about the detent portions of the slots of the cabinet bracket, thereby raising or lowering the roller and hence altering the height of the appliance.

9 Claims, 4 Drawing Sheets

SYSTEM AND METHOD FOR LEVELING AN APPLIANCE

CROSS-REFERENCE TO RELATED APPLICATIONS

This application claims priority to the U.S. provisional patent application serial No. 60/305,791 entitled "System for Mounting Wheel Assemblies to Refrigerators and Freezers" filed on Jul. 16, 2001.

BACKGROUND OF THE INVENTION

The present invention relates generally to a system and method for leveling appliances. More particularly, though not exclusively, the present invention relates to a system and method for leveling a household appliance, such as a refrigerator or freezer, that may be easily installed and adjusted without unintentionally disengaging.

Leveling devices are commonly used on household appliances. While most floors are generally flat, these devices allow precise leveling so that doors and shelves of the appliance will properly open and close. Adjustable legs that have a flat pad for engaging the floor have been used for many years. However, when the mobility of the appliance is a consideration, rollers have been incorporated into the leveling device.

Installation of these devices has proven problematic. U.S. Pat. No. 3,534,430 issued to Kesling is typical of the prior art. The leveling device disclosed in the Kesling patent incorporates a wheel and screw arrangement that allows the user to adjust the level of the appliance by turning the screw. However, it has become apparent that the installation of such desirable roller assemblies is problematic.

Most leveling devices, such as the one disclosed in the Kesling patent, are installed into the bottom of the appliance housing on-site. Many appliances such as refrigerators and freezers should not be placed on their sides. Therefore, the appliance must be raised in order to install the leveling device. This poses a great danger to the installer. Should the appliance tip over onto the installer during installation of the leveling device, serious injury might result. This requires the installer to perform the difficult and time-consuming task of assembling and inserting the leveling device underneath the appliance. This often requires inserting a pin into a pair of holes while the roller assembly is in place underneath the appliance. It is desirable to be able to install a leveling device in an efficient and safe manner.

Not all leveling devices use pins or other complex assembly methods to connect the leveling device to the appliance. U.S. Pat. No. 4,783,87 to Weaver discloses a leveling device that is secured into a specially-created slot. This slot allows the installer to insert the roller assembly without having to perform an extremely cumbersome task. However, should the appliance tip over during installation, the Weaver roller assembly fall out or pivot about the installation slot and allow the appliance to fall onto the installer's hand, causing serious injury. For proper installation, the Weaver assembly must be further secured with screws. It is therefore desirable to provide a leveling device that may be quickly installed into a secured position without the need for additional fasteners.

Accordingly, a primary feature of the present invention is the provision of a method and system for leveling an appliance that overcomes problems found in the prior art.

Another feature of the present invention is the provision of a method and system for leveling an appliance that is easy to install.

Another feature of the present invention is the provision of a method and system for leveling an appliance that can be installed in a secured position without the need for additional retaining means.

Another feature of the present invention is the provision of a method and system for leveling an appliance that is adjustable.

Another feature of the present invention is the provision of a method and system for leveling an appliance that may be fitted with a roller.

A further feature of the present invention is the provision of a method and system for leveling an appliance that is relatively inexpensive.

These and other features and advantages will become apparent from the following specification and claims.

BRIEF SUMMARY OF THE INVENTION

The present invention generally comprises a method and system for leveling an appliance. More specifically, the present invention generally includes a cabinet bracket and a wheel assembly. The cabinet bracket has a pair of opposing side walls that each contain slot including a detent portion.

A wheel assembly is provided with a pair of rockers that fit into the slots. The slots in the bracket are specially designed to include a detent portion forming a corner about which the rockers can rotate. The rockers are preferably formed from the same piece of material as the wheel assembly housing. In this manner, the wheel assembly easily slides into a secured position in the cabinet bracket without the need for additional parts.

Should the appliance fall during installation, the weight of the appliance will cause the rockers to rotate into the detent portion of the bracket. This prevents the wheel assembly from inadvertently disengaging during the installation process.

Additionally, an adjustment member, such as a screw, is secured to the wheel assembly. The adjustment member allows the installer to vary the height of the wheeled leveling device, quickly and safely leveling the appliance.

DETAILED DESCRIPTION OF THE INVENTION

The present invention will be described as it applies to its preferred embodiment. It is not intended that the present invention be limited to the preferred embodiment. It is intended that the invention cover all modifications and alternatives that may be included within the spirit and scope of the invention.

Figure 1:
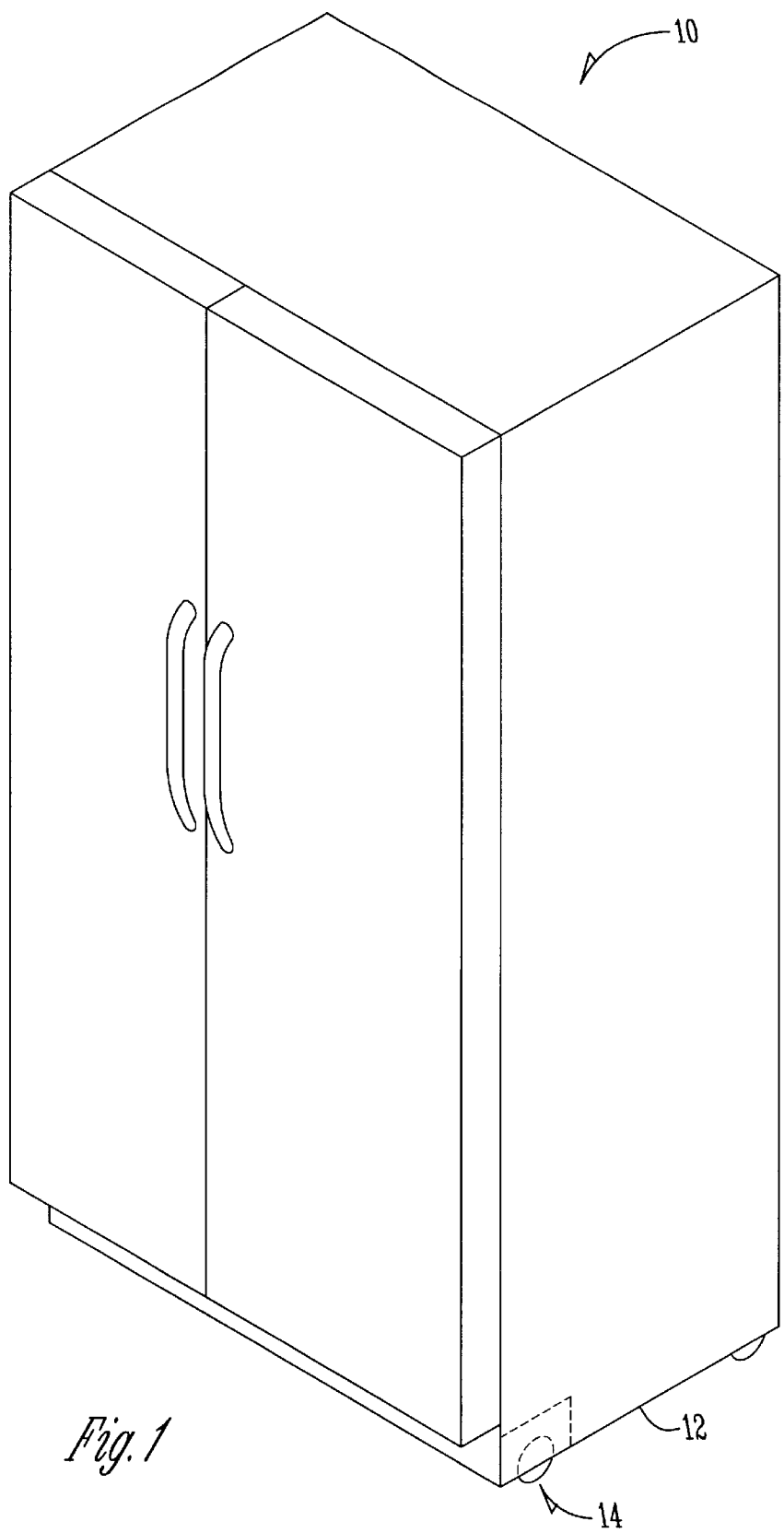
FIG. 1 is a perspective view of an appliance such as a household refrigerator or freezer, which may be adapted for use with the system and method of the present invention.

As shown in FIG. 1, a household appliance such as a refrigerator 10 generally will include a plurality of wheeled leveling devices 14 at or near the bottom 12 of the refrigerator 10. Alternatively, the refrigerator 10 may include one or more non-adjustable legs or wheels in combination with one or more wheeled leveling devices 14. One embodiment of the wheeled leveling device 14 of the present invention is shown in FIG. 2.

Figure 2:
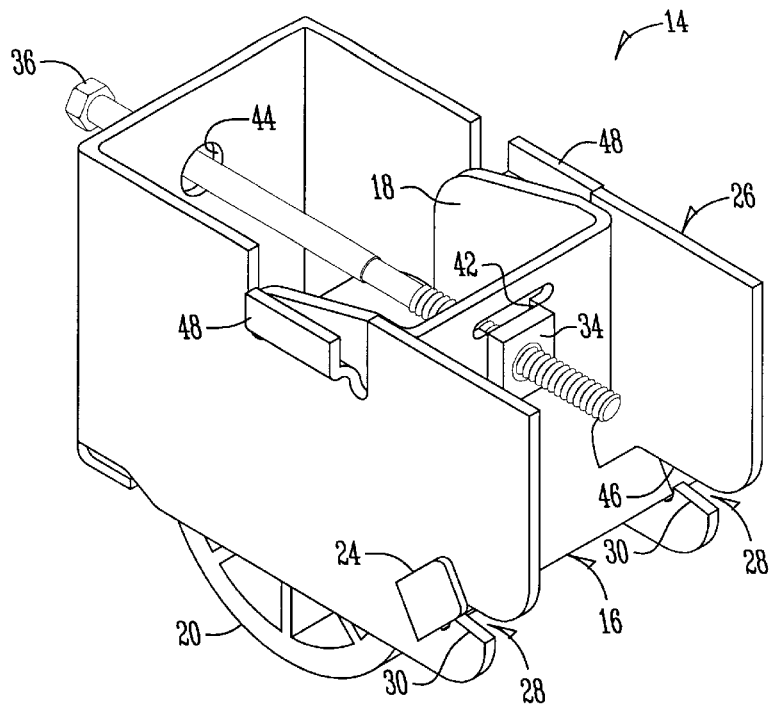
FIG. 2 is a perspective view of the preferred embodiment of the system for leveling an appliance of the present invention.

As shown in FIG. 2, the wheeled leveling device 14 of the present invention includes a wheel assembly 16 secured in a cabinet bracket 26. The cabinet bracket 26 may be a stand alone part that secures to the bottom 12 of the refrigerator 10 by a pair of seating tabs 48. Alternatively, the cabinet bracket 26 may be incorporated into the bottom 12 of the refrigerator 10.

Figure 4:
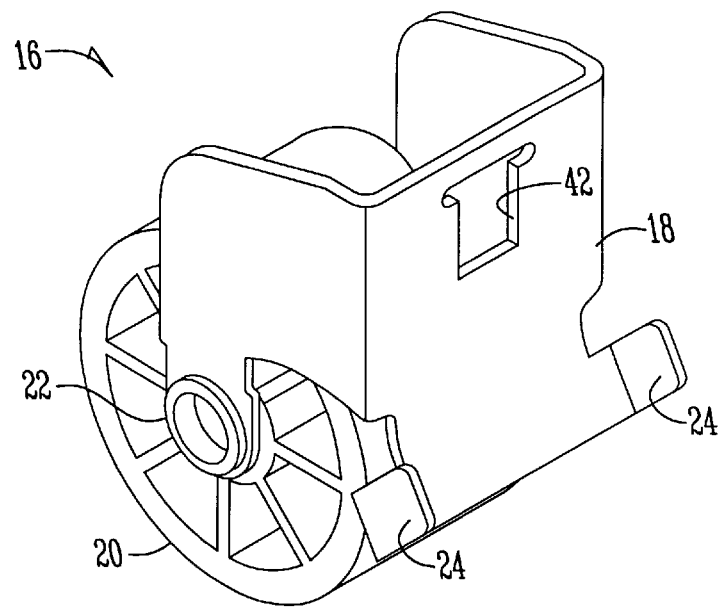
FIG. 4 is a perspective view of the wheel assembly of the present invention.

The wheel assembly 16 shown in FIG. 4 includes a wheel assembly bracket 18 to which a roller 20 is rotatably secured by an axle pin 22. The wheel assembly bracket 18 also includes a pair of rockers 24 that are essentially upward turned tabs preferably formed with the wheel assembly bracket 18. Alternatively, the rockers 24 may consist of one or more separate pieces connected to the wheel assembly bracket 18.

Figure 3:
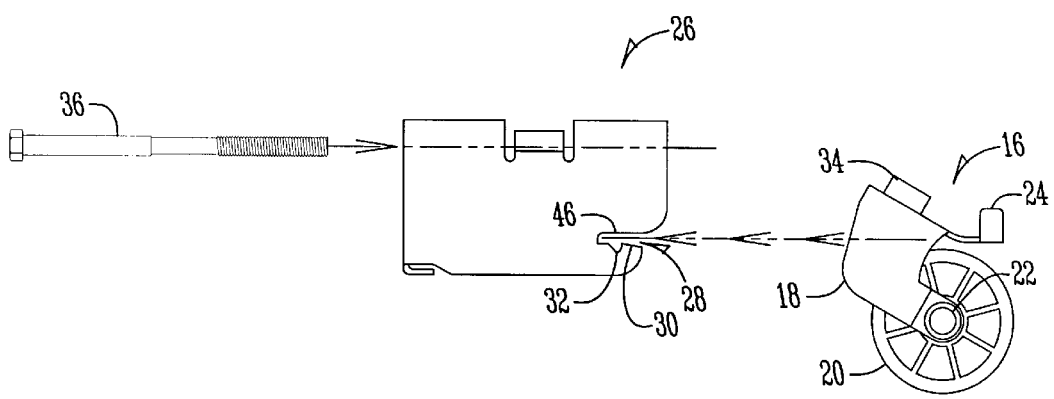
FIG. 3 is an exploded side view of the cabinet bracket and wheel assembly of the present invention.
Figure 5:
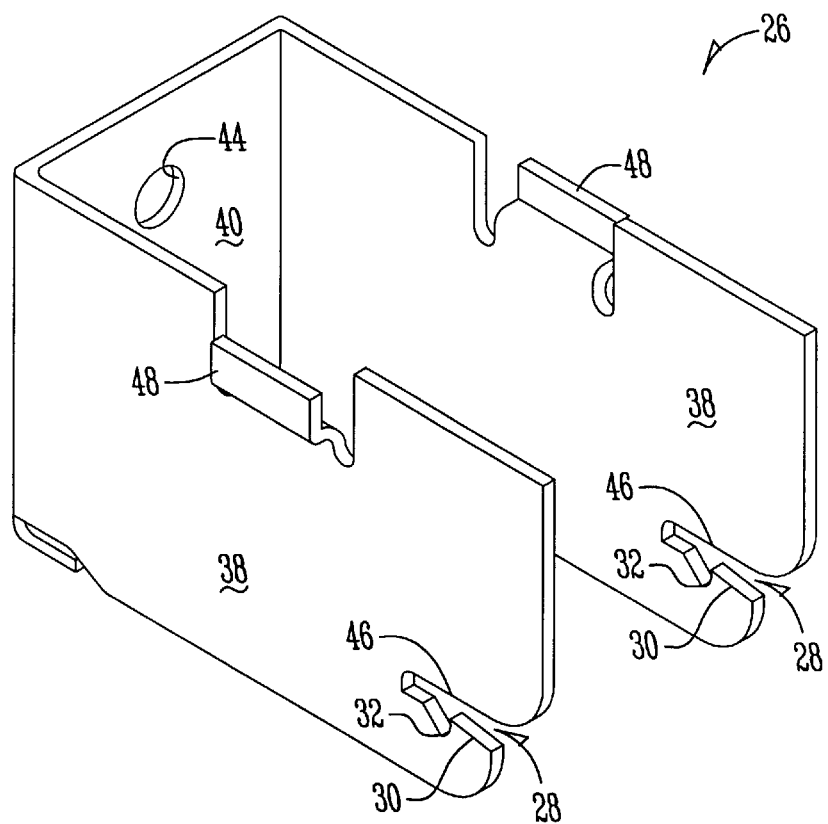
FIG. 5 is a perspective view of the cabinet bracket of the present invention.

The entire wheel assembly 16 is rotatably mounted into the cabinet bracket 26. As shown in FIG. 5, the cabinet bracket 26 includes a pair of opposing side walls 38 and a rear wall 40. Each side wall 38 includes a slot 28. Each slot 28 includes a straight portion 30 that allows the rockers 24 to slide into the cabinet bracket 26, as shown in FIG. 3. Each slot 28 also includes a detent portion 32. The detent portion 32 acts as both a pivot point for the rocker 24 and as a stop to prevent the wheel assembly 16 from backing out of the slot 28 in the cabinet bracket 26. This insures that installation of the wheel assembly 16 into the cabinet bracket 26 occurs quickly and safely.

As shown in FIG. 2, a threaded fastener 34 snaps onto a hole 42 in the wheel assembly bracket 18. When installed, an adjustment screw 36 can be inserted through the hole 44 in the cabinet bracket 26 to interact with the threaded fastener 34 on the wheel assembly bracket 18.

Figure 6:
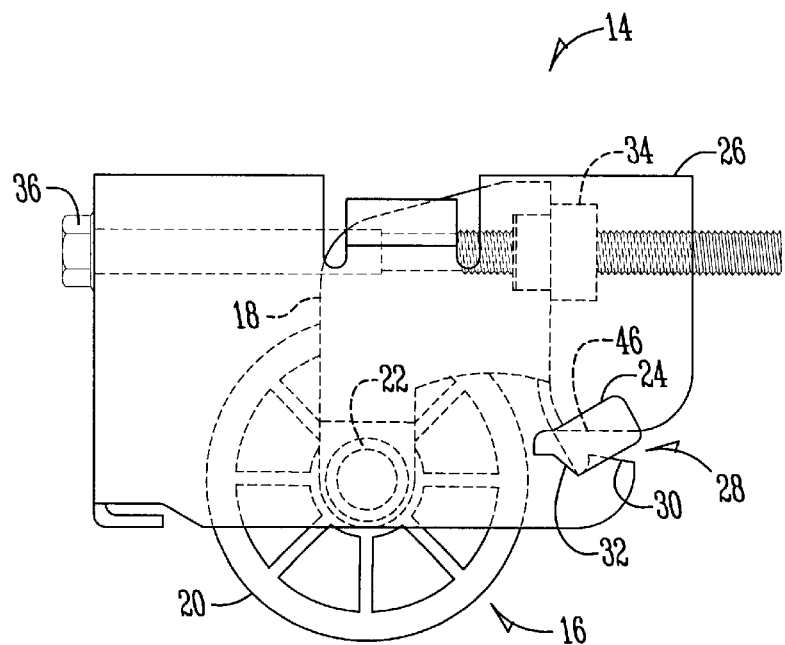
FIG. 6 is a side view of the cabinet bracket and wheel assembly of the present invention with the wheel assembly fully retracted.

As shown in FIG. 6, the weight of the refrigerator 10 pushing down on the wheeled leveling device 14 will cause the wheel assembly 16 to pivot about the axis defined by the rockers 24 in the detent portions 32 of the slots 28 thereby minimizing the extension of the roller 20 from the cabinet bracket 26. Without additional adjustment, the roller 20 will retract inside the cabinet bracket 26 until the rockers 24 press against the upper portions 46 of the slots 28.

Figure 7:
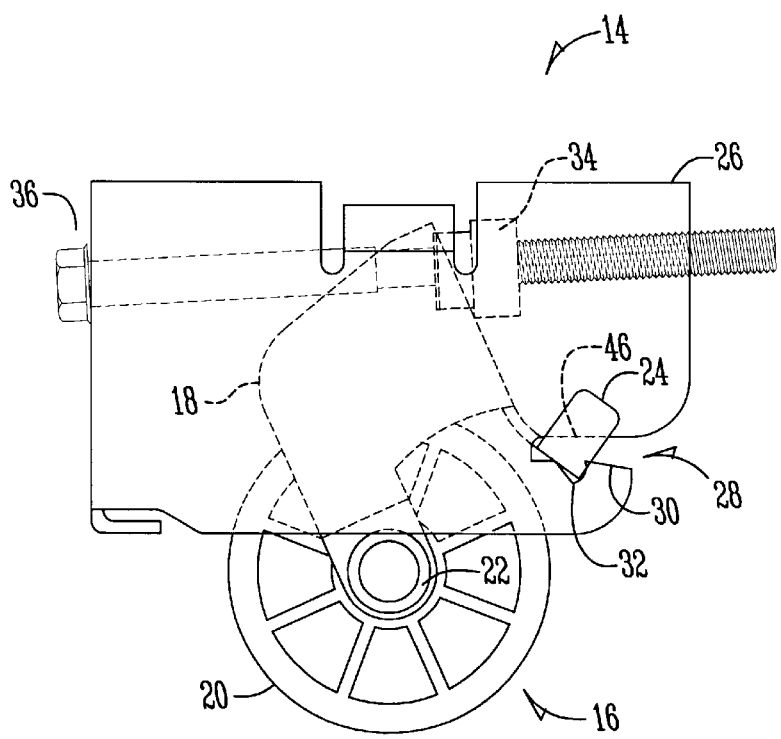
FIG. 7 is a side view of the cabinet bracket and wheel assembly of the present invention with the screw fully engaged and the wheel assembly fully extended.

Additional adjustment can be accomplished using the adjustment screw 36 and threaded fastener 34. As shown in FIG. 7, tightening the adjustment screw 36 causes the wheel assembly 16 to pivot about the axis defined by the rockers 24 in the slots 28 thereby extending the roller 20 and the refrigerator 10 until the screw 36 is fully engaged with the threaded fastener 34. Alternatively, loosening the adjustment screw 36 causes the wheel assembly 16 to pivot about the axis defined by the rockers 24 in the detent portions 32 of the slots 28 in the opposite direction, retracting the roller 20 under the weight of the refrigerator 10 and thereby lowering the refrigerator 10.

Thus, it can be seen that the wheeled leveling device 14 can be easily installed and adjusted, thereby safely raising or lowering the household appliance 10. In addition, it can be seen that installation of the wheeled leveling device 14 can be accomplished without the need for additional fasteners. Further, it can be seen that when a plurality of wheeled leveling devices 14 are employed, the household appliance 10 can be quickly and safely leveled with precision.

Whereas the invention has been shown and described in connection with the preferred embodiments thereof, it will be understood that many modifications, substitutions, and additions may be made which are within the intended broad scope of the following claims. From the foregoing, it can be seen that the present invention accomplishes at least all of the stated objectives.

What is claimed is:

1. A wheeled leveling device for a home appliance, the leveling device comprising:
    a cabinet bracket having a rear wall and two opposite side walls each including a slot;
    a wheel assembly having a roller rotatably secured to a wheel assembly bracket, the wheel assembly bracket having a air of rockers formed to slide into and engage the slots in the side walls of the cabinet bracket; and
    an adjustable screw that passes through a hole in the rear wall of the cabinet bracket and through a hole in the wheel assembly bracket and engages a threaded fastener secured to the wheel assembly bracket.

2. The wheeled leveling device of claim 1 wherein the slot in each of the side walls of the cabinet bracket includes a straight portion.

3. The wheeled leveling device of claim 1 wherein the slot in each of the side walls of the cabinet bracket includes a detent portion.

4. The wheeled leveling device of claim 1 wherein the rockers of the wheel assembly bracket are formed into the wheel assembly bracket.

5. The wheeled leveling device of claim 1 wherein the cabinet bracket includes a plurality of seating tabs securing the bracket to the bottom of the household appliance.

6. A method of safely leveling a household appliance having a top, bottom, and sides, the method comprising:
    sliding tabs on a wheel assembly into slots in side walls of a cabinet bracket on the bottom of the appliance;
    engaging the wheel assembly with detent portion in each slot;
    rotating the wheel assembly about the detent portion;
    engaging an adjustment screw with a threaded fastener secured to the wheel assembly bracket;
    turning the adjustment screw to adjust the height of the appliance.

7. A method of leveling a household appliance comprising:
    sliding a wheel assembly into slots in side walls of a cabinet bracket, the slots including a detent portion;
    engaging the wheel assembly with the detent portion of each slot;
    rotating the wheel assembly about the detent portion of each slot;
    passing an adjustment screw through a hole in a rear wall of the cabinet bracket and a hole in the wheel assembly and engaging the adjustment screw with a threaded fastener secured to the wheel assembly;
    turning the adjustment screw to adjust the height of the household appliance.

8. The method of claim 7 wherein the cabinet bracket is part of the bottom of the household appliance.

9. The method of claim 7 wherein the wheel assembly includes a rocker.

* * * * *